July 9, 1957 W. LEHMANN 2,798,821
METHOD OF FORMING A UNIFORM LAYER OF LUMINESCENT
MATERIAL ON A SURFACE
Filed March 29, 1954
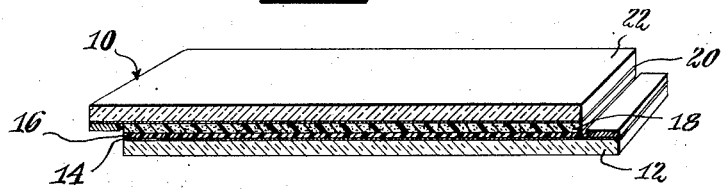
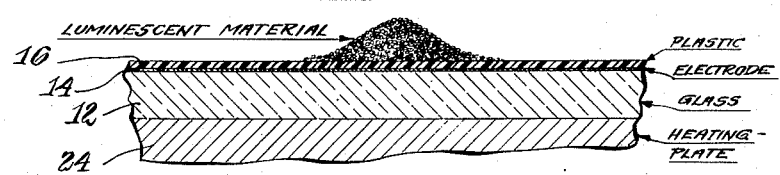
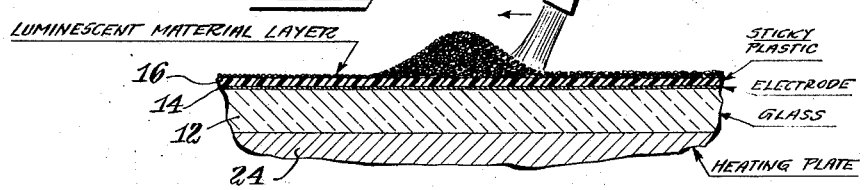
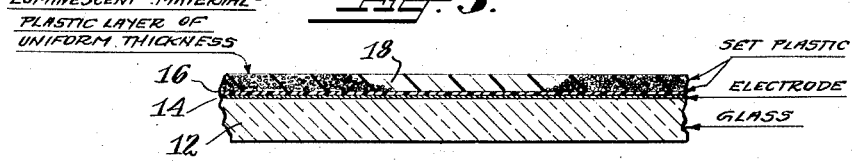
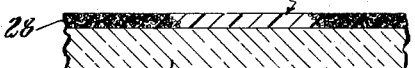
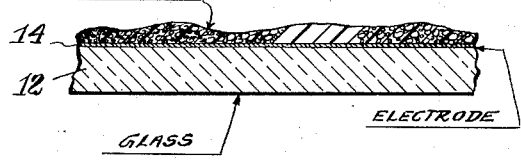
INVENTOR.
WILLI LEHMANN
ATTORNEY

United States Patent Office 2,798,821
Patented July 9, 1957

2,798,821

METHOD OF FORMING A UNIFORM LAYER OF LUMINESCENT MATERIAL ON A SURFACE

Willi Lehmann, East Orange, N. J., assignor to Westinghouse Electric Corporation, East Pittsburgh, Pa., a corporation of Pennsylvania Application March 29, 1954, Serial No. 419,386

2 Claims. (Cl. 117—21)

This invention relates to luminescent screens and, more particularly, to a method for making a luminescent screen which is very uniform.

Heretofore, luminescent screens have been widely used in electron microscopy, oscilloscopes, television tubes, etc. and a form of luminescent screen has even been utilized in electroluminescent cells where separate dielectric and luminescent material-dielectric layers are sandwiched between two electrodes, as described in copending application of Robert B. Windsor, Serial No. 286,837, filed May 8, 1952, titled "Electroluminescent Cell," and owned by the present assignee, now abandoned, or where the luminescent material is embedded throughout the dielectric as described in Mager Patent 2,566,349.

In all of the foregoing applications, other than electroluminescent cells, there is often need for increased resolution power of the luminescent screen, and this is particularly true in electron microscopy applications and in some types of oscilloscopes. As is obvious, the smaller the average particle size of the luminescent material comprising the luminescent screen the better the resolution, just as a fine grain photographic plate will have better resolution than a coarser grain plate.

In electroluminescent cells there is need for finer luminescent particles, for relatively coarse luminescent particles and particle agglomerates produce irregularities in the surface and in the thickness of the luminescent material layer which in turn causes the electric field across the luminescent material to vary in different portions of the cell. This in turn causes the cell brightness to vary from one cell portion to another.

Various methods have been employed in making luminescent screens for oscilloscopes and related applications such as depositing the fluorescent material by sedimentation as described in Patent No. 2,536,586 of Waye et al., or by settling the luminescent material onto a foundation as described in Patent No. 2,573,051 to Pakswer et al. Also the luminescent materials have been suspended in a binder, such as nitrocellulose and flushed or flowed onto the foundation surface to be coated, after which the binder is volatilized leaving the residual luminescent coating. This method is commercially used in coating fluorescent lamps, and in making electroluminescent cells as well as many other applications.

In all the various foregoing methods of application, the coarse luminescent material particles as well as the particle agglomerates will form a part of the luminescent screen, which screen will accordingly have relatively uneven resolution characteristics. Also, because of the methods of making such luminescent screens, the thickness of the luminescent material layer will vary thereby producing areas in which the sensitivity as well as the resolution is affected and, as heretofore noted, this variation in sensitivity is particularly noticeable in the case of electroluminescent cells.

It is the general object of the invention to avoid and overcome the foregoing and other difficulties of and objections to prior art practices by the provision of a method of forming a highly uniform luminescent screen.

It is a further object to provide a method of preparing a luminescent screen of substantially uniform thickness wherein the particle size of the luminescent materials may be readily controlled.

It is still a further object of this invention to provide a method of preparing a luminescent screen wherein the larger luminescent particles and luminescent particle agglomerates can be substantially eliminated.

The aforesaid objects of this invention, and other objects which will become apparent as the description proceeds are achieved by providing a method of preparing a luminescent screen which method comprises coating a foundation with a thermoplastic, heating the thermoplastic while simultaneously brushing luminescent particles over the heated thermoplastic and increasing the heating while continuing to brush until the luminescent layer attains the desired thickness.

For a better understanding of the invention, reference should be had to the accompanying drawing wherein:

Fig. 1 is a perspective view of an electroluminescent cell which represents one application for the highly uniform luminescent screen of this invention.

Fig. 2 is a sectional elevational view of a portion of the electroluminescent cell of Fig. 1 showing the first step in preparing the luminescent screen of this invention;

Fig. 3 illustrates the second step in preparing the luminescent screen.

Fig. 4 indicates the the brushing step used in preparing the luminescent screen of this invention.

Fig. 5 illustrates the formed luminescent screen of this invention.

Fig. 6 illustrates a luminescent screen as made by the methods of the prior art.

Fig. 7 illustrates another embodiment of the invention.

Although the principals of this invention are broadly applicable to electron microscopy, oscilliscopes, television receiver picture tubes, and other applications where a highly uniform luminescent screen is desired, the invention is equally applicable to an electroluminescent cell and hence it has been so illustrated and will be so described.

With specific reference to the form of the invention illustrated in the drawing, the numeral 10 in Fig. 1 indicates generally an electroluminescent cell comprising a glass foundation 12, transparent electrode conducting layer 14, thermoplastic dielectric layer 16, luminescent material layer 18, electrode conducting layer 20 and backing plate 22. Electrodes 14 and 20 may consist of a thin transparent layer of tin oxide, if desired, or one electrode may be fabricated of tin oxide, and the other electrode, for example 20, may consist of a thin layer of vaporized aluminum or silver if only one electrode is to be transparent. The backing plate 22 may be eliminated, if desired, for one backing or foundation plate will normally provide adequate rigidity for the cell. The luminescent material may be evenly distributed throughout the dielectric or may be distributed only throughout the upper portions of the dielectric, as illustrated. It should be noted that in all the figures of the drawing the luminescent material layers and plastic layers as well as the conductive coatings are not drawn to scale, but are enlarged for purposes of illustration.

In Fig. 2 is illustrated the first stage in fabricating the luminescent screen. If the screen is to be used in an electronmicroscope or oscilloscope, etc. the thin transparent conducting electrode layer 14 will not be used, but if the luminescent screen is to be fabricating into an electroluminescent cell, as illustrated, the thin conducting layer 14 is necessary and may be applied to the glass foundation 12 as described in Patent No. 2,522,531 to J. M. Mochel. While the foundation 12 is glass in the embodiment as illustrated, a metal or other opaque foundation may be used where the luminescent screen application will permit, such as electron microscopy.

The thermoplastic layer 16 is then applied over the conducting layer 14 or the foundation 12, as the case may be, by flushing or flowing the thermoplastic, or by heating a preformed sheet of thermoplastic. This thermoplastic is preferably cellulose acetate, but other thermoplastic heat sealable materials such as vinyl chloride, polyethylene or other suitable thermoplastics may be used, the requirements for these thermoplastics being that they are colorless or at least translucent, have good adherence for glass or a metal or other foundation and are chemically neutral with respect to the luminescent material which is to be used in forming the luminescent screen. It should be noted that good thermoplastic adherence for glass is normally indicative of good adherence for metal.

In forming the thermoplastic layer, cellulose acetate may be dissolved in an equal weight of acetone and sprayed onto the conducting layer 14 while the foundation 12 is maintained in a level disposition, a respective thickness of the thermoplastic layer being about 50 microns, for example. To achieve a thermoplastic layer thickness of about 50 microns where the coated area is 1 sq. meter in area, about 0.6 gram of cellulose acetate may be dissolved in about 0.6 gram of acetone and the solution sprayed over the area to be coated, after which the acetone is volatilized. Alternately, a sheet of cellulose acetate about 50 microns thick may be placed over the conducting layer 14 which is then heated to a temperature slightly more than twice the softening temperature of the cellulose acetate, for example about 250° C., at which temperature the cellulose acetate will adhere to the conducting layer 14. The thermoplastic layer 16 is then allowed to cool and harden. A representative softening temperature for cellulose acetate is 70° C.–100° C. and such material is manufactured by Celanese Corp. of America under the trademark "Lumarith," and by Nixon Nitration Works under the trademark "Nixon C/A."

The luminescent material is then applied to the cooled thermoplastic layer 16, as illustrated in Fig. 3. The individual particle size of the luminescent material may vary greatly depending upon the luminescent material which is used and how the material was prepared. As an example, zinc sulfide activated by 10 parts by weight of copper and fired at about 1050° C. for 20 minutes will have an average particle size of about 18 microns and the individual particles may vary between 1 micron and 35 microns. Zinc sulfide activated by $10^{-4}$ parts by weight of copper and fired at about 950° for 20 minutes will have an average particle size of about 10 microns and the individual particles may vary between about 1 micron and about 20 microns. Both luminescent materials, however, will display agglomerates which attain the size of about 100 microns or larger.

The foundation 12 is placed over a heating plate 24 and slowly warmed to a temperature which may vary from a temperature slightly above the softening temperature of the thermoplastic to a temperature which is more than twice the softening temperature of the thermoplastic. Simultaneously while heating, a luminescent material is continuously dusted across the thermoplastic with a fine brush or by an equivalent means, such as dusting, wobbling or vibrating the foundation from side to side to allow the luminescent material to be evenly distributed and moved from one portion of the heated thermoplastic surface to another. On first warming, the thermoplastic layer becomes slightly adhesive for the luminescent material as its softening temperature is approached. As the luminescent material is distributed and moved over this slightly adhesive thermoplastic only the very finest luminescent material grains will adhere in a very thin and uniform layer with gaps of exposed thermoplastic between the very fine adhering grains. As the luminescent material is continuously moved across the surface of the slightly adhesive thermoplastic, all of the gaps, i. e. exposed thermoplastic material between phosphor particles, will be filled with other very fine luminescent material grains until the entire thermoplastic surface is covered with what might be termed a monoparticle layer of very fine luminescent particles. As the heating temperature is gradually increased the thermoplastic continues to soften to a greater extent and some of the thermoplastic emerges from between the first layer of luminescent material grains to the surface of the monoparticle layer. With continued movement of the luminescent material the finest luminescent material particles will adhere to the thermoplastic emerging through the first monoparticle layer and a second monoparticle layer of finely divided luminescent material is disposed over the first. The heating and particle movement are continued until the desired thickness of the luminescent material layer is attained.

The average luminescent material particle size in the layer will mainly depend upon how rapidly the thermoplastic layer is heated and to a lesser degree on how adhesive the thermoplastic layer becomes, which of course is dependent upon how far above its softening temperature the thermoplastic is heated. There are given in the following table six specific examples of a luminescent material layer in which are represented the effects of varying the time of heating and the temperature of heating. In all of these examples the thermoplastic is heated at a constant rate from room temperature up to the maximum temperature indicated. It is obvious that the thermoplastic could be quickly raised to the maximum heating temperature and maintained at this temperature until the desired thickness of luminescent layer is attained, but such variations in coating techniques are more a matter of choice and design.

[Plastic material—cellulose Acetate 50µ thick. Luminescent material—ZnS:$10^{-4}$ Cu-fired 950° C. for 20 min.]

| Example: | | | | | | |
|---|---|---|---|---|---|---|
| Thickness of plastic layer, microns | 50 | 50 | 50 | 50 | 50 | 50 |
| Luminescent material particle size before coating (incl. agglomerates), microns | 1-100 | 1-100 | 1-100 | 1-100 | 1-100 | 1-100 |
| Heating time, minutes | 2 | 10 | 30 | 2 | 10 | 30 |
| Heating temp. (max.), ° C | 250 | 250 | 250 | 150 | 150 | 150 |
| Range of particle sizes in luminescent material layer, microns | 1-20 | 1-7 | 1-3 | 1-15 | 1-5 | 1-2 |
| Thickness of luminescent material layer, microns | 40 | 44 | 50 | 10 | 12 | 15 |

An analysis of the foregoing table shows that the average luminescent material particle size in the luminescent screen is quite dependent upon the time of application of thermoplastic heating and relatively independent of the maximum heating temperatures utilized. This can be explained on the basis that when the thermoplastic is heated slowly it first displays only limited adhesive tendency toward the particles of the luminescent materials and only the finest particles will adhere. By the time the heating temperature has been increased sufficiently during this slow heating cycle to measurably increase the adhesive characteristics for the luminescent particles there is a "buffer" of very fine particles through which the thermoplastic must find its way before more luminescent particles can adhere. Since the heating cycle is very slow only a relatively small amount of thermoplastic will find its way through the luminescent particle layer during any one interval and this produces a tendency to hold only the finer particles while allowing the coarser luminescent particles to be brushed over this relatively small amount of thermoplastic which has found its way through the luminescent material layer. Even when the final heating temperature utilized during this slow heating cycle is quite high, the tendency of the thermoplastic to very slowly work through the luminescent particles will result in only the finest of particles adhering to form the luminescent screen.

In contrast, when the thermoplastic is heated quite rapidly to the maximum heating temperature the thermoplastic will show a strong adhesive tendency for the luminescent particles in a relatively short time and thus retain the larger luminescent material particles as well as the smaller luminescent material particles. As the rapid heating cycle is continued, relatively large amounts of thermoplastic will in any given period find their way through the already adhering luminescent particles and the tendency to contain the larger luminescent particles as well as the smaller luminescent particles will continue.

The thickness of the luminescent layer is quite dependent upon the maximum heating temperature utilized and dependent to a considerably lesser degree upon the time of heating, i. e. the time utilized in raising the heating temperature of the thermoplastic from room temperature to the maximum temperature as indicated in the foregoing table. This can be explained on the basis that when the thermoplastic is heated only to relatively low maximum temperature, the thermoplastic never develops a very strong adhesive tendency toward the luminescent particles, and only a relatively small amount of luminescent particles will be retained by the thermoplastic. Conversely, when a higher maximum heating temperature is attained the thermoplastic will display a relatively strong adhesive tendency for the luminescent particles and more of the particles will be retained in the layer, resulting in a thicker coating. Of course the luminescent layer thickness is also dependent upon the time of application of heat as well as the maximum temperatures utilized, but to a much lesser degree than with respect to the maximum temperatures encountered.

In the example as illustrated, the luminescent materials are embedded only throughout the upper portion of the dielectric layer because of the initial thickness of the thermoplastic layer and the quantum of heat applied. It is obvious that were the maximum heating temperature to be increased over the maximum temperature given in the examples, the thermoplastic would continue to find its way through the monoparticle thick luminescent material layers until the first applied or bottom layer of luminescent material reached the conducting layer 14 or foundation 12, as the case may be. At this point the luminescent screen will consist of a homogeneous mixture comprising a plurality of monoparticle layers of luminescent material bound in place by thermoplastic. Such an embodiment is illustrated in Fig. 7 wherein a steel foundation 26 has coated thereover a homogeneous layer 28 of luminescent material and thermoplastic.

In the embodiment as illustrated in Fig. 6 the maximum heating temperature was not sufficiently high or continued for a sufficient period to cause the luminescent material to be substantially evenly embedded throughout the thermoplastic, but as an example, if the maximum heating temperature was about 300° C. and the time of heating about 30 minutes and the thermoplastic was originally about 50 microns thick, the luminescent material particles would be substantially evenly embedded throughout the entire thickness of the thermoplastic layer.

It will be recognized that the objects of the invention have been achieved by providing a method of forming a highly uniform luminescent screen wherein the screen thickness is substantially uniform and wherein the size of the luminescent particles comprising the screen can be controlled.

While in accordance with the patent statutes one best known embodiment of the invention has been illustrated and described in detail, it is to be particularly understood that the invention is not limited thereto or thereby.

I claim:

1. The method of forming on a substantially even surface of a foundation a substantially uniform layer of finely-divided solid luminescent material particles, comprising coating said surface with a thin substantially uniform layer of a glass-adherent radiation-transmitting thermoplastic material having a softening temperature which is less than the softening temperature of said foundation, depositing a mass of finely-divided luminescent material containing particles of varying sizes on said thermoplastic material coated on said foundation, slowly heating said foundation and said thermoplastic material coated thereon until said thermoplastic material begins to soften, and moving said deposited finely-divided luminescent material over said heated thermoplastic material to cause only the finer particles of said deposited luminescent material to adhere to said heated thermoplastic material.

2. The method of forming on a substantially even surface of a foundation a substantially uniform layer of finely-divided solid luminescent material particles, comprising coating said surface with a thin substantially uniform layer of a glass-adherent radiation-transmitting thermoplastic material having a softening temperature which is less than the softening temperature of said foundation, depositing a mass of finely-divided luminescent material containing particles of varying sizes on said thermoplastic material coated on said foundation, slowly heating said foundation and said thermoplastic material coated thereon until said thermoplastic material begins to soften, moving said deposited finely-divided luminescent material over said heated thermoplastic material to cause only the finer particles of said deposited luminescent material to adhere to said heated thermoplastic material, and slowly increasing the temperature of heating of said foundation and said thermoplastic material coated thereon while repeatedly moving said deposited finely-divided luminescent material thereover to cause more of the finer of said deposited luminescent material to adhere to said heated thermoplastic material until a luminescent material layer of desired thickness is obtained.

References Cited in the file of this patent

UNITED STATES PATENTS

| | | |
|---|---|---|
| 1,342,767 | Schlesinger | June 8, 1920 |
| 1,532,795 | Balch | Apr. 7, 1925 |
| 1,637,963 | Sauvage | Aug. 2, 1927 |
| 2,030,439 | Fritz et al. | Feb. 11, 1936 |
| 2,129,295 | Wurstlin et al. | Sept. 6, 1938 |
| 2,261,782 | Staude | Nov. 4, 1941 |
| 2,554,017 | Dalton | May 22, 1951 |
| 2,559,279 | Charles | July 3, 1951 |
| 2,624,857 | Mager | Jan. 6, 1953 |
| 2,683,095 | Paucek | July 6, 1954 |